United States Patent Office 2,693,201
Patented Nov. 2, 1954

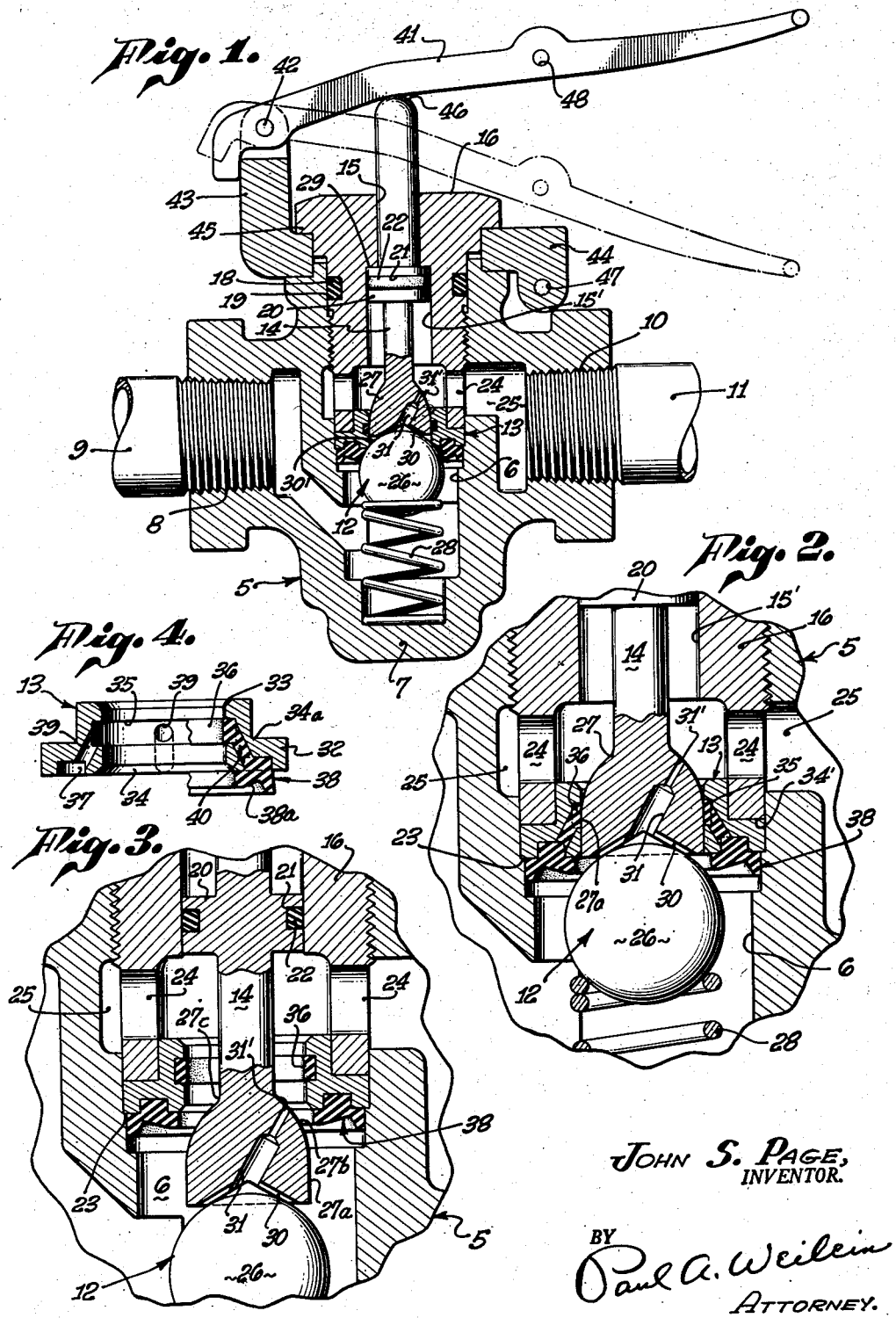

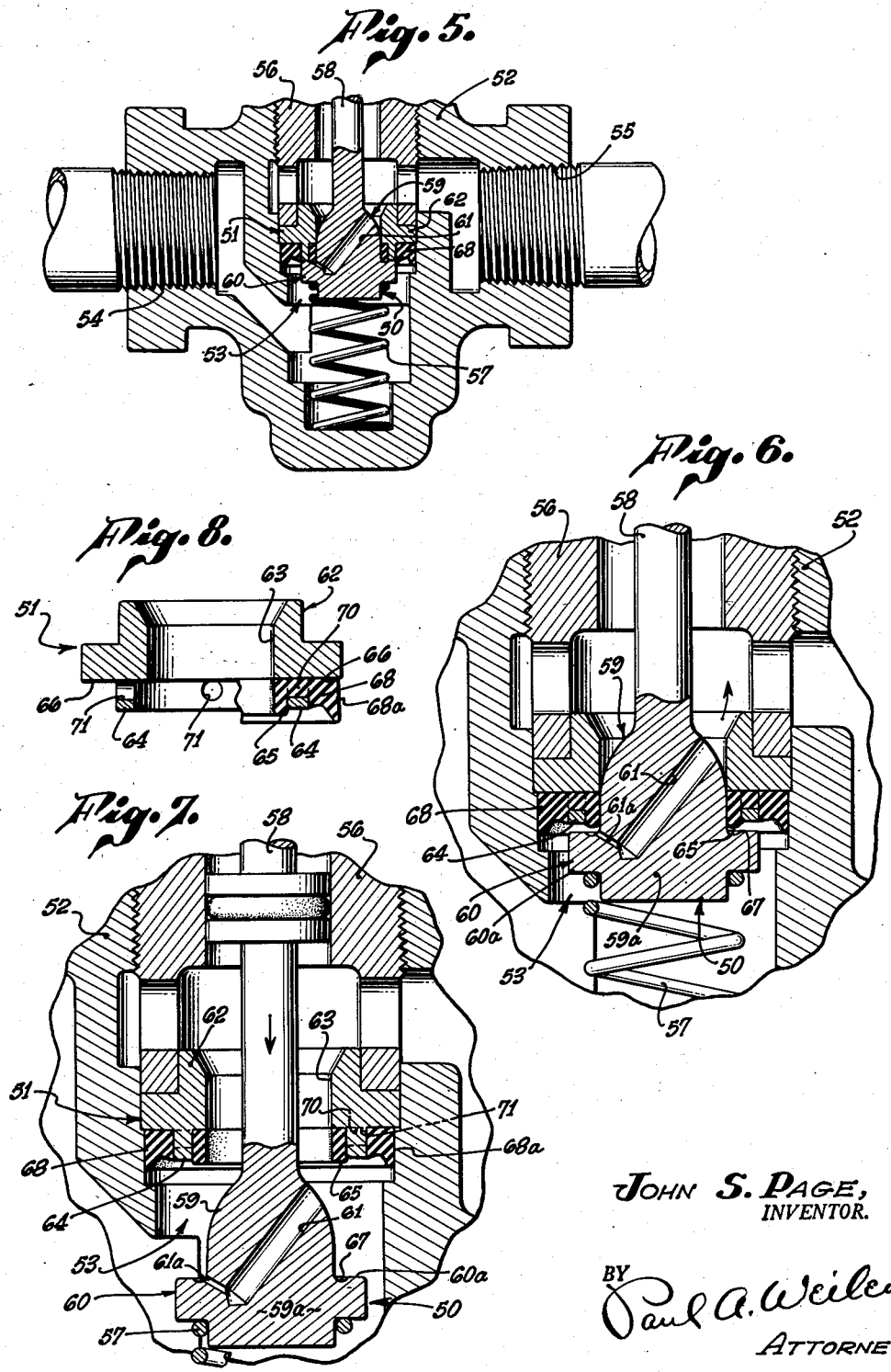

2,693,201
VALVE
John S. Page, Long Beach, Calif.

Application August 14, 1950, Serial No. 179,133

22 Claims. (Cl. 137—625.12)

This invention relates to valves and particularly to a valve structure for drawing off fluid from conduit lines or other vessels containing fluid under pressure.

In industries treating with petroleum, chemical, and other fluids conducted or maintained under pressure in conduit lines or other vessels, it is desirous that the drawing off of quantities of fluid for tests or other purposes be affected in various amounts as quickly as possible without appreciably affecting the line or storage pressure or causing leakage or creating personal injury, or property damage hazards due to leakage.

It is also desirous in some instances that the volume of fluid drawn off may be increased or decreased at will; that in other instances the conduit line or vessel may quickly be bled or emptied, and that in all cases no leakage will take place.

Valves heretofore employed for such purposes have not fulfilled the above requirements. They have either caused objectionable reduction of line or storage pressure or required too great a length of time to obtain amounts of fluid necessary for conclusive tests, and have not positively prevented leakage.

The drawing off of the fluid and consequent testing therefor should take place in as short a time as possible, not only to be conclusive as to test, but in order that the treatment or handling of the fluid may be modified or changed in the best interests of efficiency and safety. Leak prevention when the valve means is shut off is most important. The time factor and leak prevention are particularly essential in the case of drawing off inflammable fluids, explosive fluids, acids, chemicals, and other fluids where critical temperatures, pressures, or other conditions would be deleterious or prove dangerous and must be determined quickly in order that proper counteractive measures may be effected, and wherein leakage after the valve is shut off may create serious hazards.

It is an object of this invention to provide an improved valve structure for the purposes described.

It is another object of this invention to provide a valve structure by means of which quantities of fluid may be drawn off from conduit lines or vessels under pressure in the advantageous manner hereinbefore noted, and without the objections and difficulties heretofore encountered.

Another object of this invention is to provide a valve structure wherein sealing means forms seals constructed and arranged whereby the response of one of the seals to fluid pressure increases the sealing action of another of the seals against a valve means to prevent such leakage past the valve means as would be objectionable in consideration of the purposes and uses of the valve structure.

It is another object of this invention to provide a valve structure for the purposes described, wherein a valve unit having dual valve elements is constructed and arranged in such a manner that the unseating of one valve element while the other valve element is seated, provides for the taking off of desired quantities of fluid in a restricted flow without appreciably effecting the line or storage pressure, and wherein the unseating of both valve elements provides for a volume-controlled and quick drawing off of larger quantities of fluid as well for a bleeding of the conduit line or vessel from which the fluid is taken.

It is a further object of this invention to provide a combined valve seat and sealing unit wherein the sealing means provides seals on opposite sides of the valve seat, to form seals for two valve elements in an arrangement such that when one element is unseated, the fluid pressure operating against the seal therefor is effective through the sealing means to increase the sealing action of the other seal against the other valve element, thereby preventing leakage such as would cause more fluid to be drawn off than normally provided with the opening of said one valve element, and consequent undesirable pressure reduction. When both valve elements are seated, the fluid pressure operating to increase the sealing action of the seal for one valve element, is effective through the sealing means for increasing the sealing action of the seal for the other valve element thereby positively preventing leakage.

This invention possesses many other advantages and has other objects which may be made more easily apparent from a consideration of several embodiments of the invention. For this purpose there are shown two forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a vertical sectional view of a valve structure embodying the present invention, showing the valve means thereof in closed position;

Figure 2 is an enlarged fragmentary vertical sectional view thereof showing the restricted flow valve element open and the main flow valve element closed;

Figure 3 is a view similar to Figure 2 showing both valve elements open; and

Figure 4 is a fragmentary sectional view partly in elevation of the combined valve seat and seal unit;

Figure 5 is a fragmentary vertical sectional view of a modified form of valve structure embodying the invention;

Figure 6 is an enlarged fragmentary sectional view of the valve structure shown in Figure 5, with the restricted flow-valve element unseated;

Figure 7 is an enlarged sectional view of the valve structure shown in Figure 5, with both valve elements unseated, and Figure 8 is a fragmentary sectional view of the valve seat and sealing member shown in Figures 5, 6 and 7.

In general, the valve structure hereof comprises a valve unit providing what may be termed a restricted flow valve element and a main flow valve element, although both elements when seated effect a positive leakproof shut off. These elements are mounted in a bore of a valve body member having inlet and outlet ports opening into the bore on opposite sides of the valve unit, there being a valve seat and sealing unit in the bore for cooperation with the valve elements. The inlet port is adapted to be connected with a conduit line or vessel containing fluid under pressure, whereas the outlet port provides for the delivery of fluid for tests or other purposes responsive to operation of the valve unit.

A restricted flow duct is provided in the valve assembly in such a manner that when the restricted flow valve element is unseated while the main flow valve element is seated, a restricted flow of fluid will be discharged through the outlet port without appreciably effecting the pressure in the conduit line or vessel.

An operating means provides for opening the restricted flow valve element while the main flow valve element remains closed or for opening both valve elements, with the main flow valve element then operable to regulate the volume of flow as desired.

The valve seat and sealing unit includes a pressure responsive sealing means and a seat structure constructed and arranged to provide on opposite sides of an annular valve seat formed thereby, fluid pressure responsive seals for the two valve elements. The seal for the main flow valve element serves as a seat therefor beyond the point where the restricted flow valve element contacts its annular seat, whereas the other seal contacts the restricted flow valve element at a point in advance of the annular seat.

When both valve elements are seated the fluid pressure operates to increase the sealing action of the seal against the restricted flow valve element, and is effective through this seal to increase the sealing action of the other seal against the main flow valve element, as the two seals are operatively connected by a means arranged in the valve seat structure to transmit force applied by the pressure fluid to one of the seals to the other seal. Thus, leakage when the valve elements are closed is positively prevented.

When the restricted flow valve element is unseated to provide for a drawing off of fluid through the restricted flow duct, fluid pressure applied to the seal from which this element is then spaced, is also effective to increase the sealing action of the seal against the main flow valve element through the force transmitted through the means of operative connection between the seals, thus preventing leakage past the main flow valve element and maintaining the restricted flow whereby no appreciable reduction takes place in the line of storage pressure.

Referring more specifically to the drawing, it will be seen that one form of valve structure embodying this invention, includes a body member 5 having a bore 6 open at one end and closed at the other end by means of a wall 7. An inlet port 8 in the body member 5 opens into the bore 6 and is adapted to be connected as by means of a conduit 9, with a conduit line or vessel (not shown) containing fluid under pressure. An outlet port 10 in the body member, opens into the bore 6 and is adapted to deliver fluid through a conduit 11 or other suitable means for test or other purposes. Thus, the bore and said ports provide a fluid passage through the valve body.

In accordance with this invention, the dual valve unit 12 is mounted in the bore 6 for cooperation with the combined valve and sealing unit 13 mounted in the bore between the inlet and outlet ports, the valve seat unit providing, in effect, dual seats.

The valve unit 12 includes a stem 14 slidable through a bore 15 in a plug 16 threadedly engaged in the bore 6. A sealing ring 18 in a groove 19 in the plug 16 seals between the wall of the bore 6 and the plug. Leakage through the bore 15 is prevented by means of a sealed piston-like enlargement 20 on the stem 14, which also acts as a guide and as a stop member in a counterbore 15' of the bore 15, there being a groove 21 in the enlargement 20 containing a sealing ring 22 which seals between the wall of the counterbore and the enlargement.

The inner end of the plug 16 abuts the valve seat and sealing unit 13 and holds it against the shoulder 23 formed in the bore 6, there being a series of radial ports 24 in the plug, opening into an anular chamber 25 formed by enlarging the bore 6 around the plug, said chamber opening into the outlet port 10.

The dual valve unit provides a restricted flow valve element 26 operating on the inlet side of the valve seat unit 13, and a main flow valve element 27 operating in the seat and sealing unit 13 at a point beyond the valve 26 and in axial alignment therewith.

As shown, in Figs. 1, 2, and 3, the restricted flow valve element 26 is spherical and urged to seat on the seat and sealing unit 13 by means of a spring 28 in the inner end bore 6, it being noted that this valve will also be pressure seated as it is disposed on the fluid inlet side of the valve seat unit.

The main flow valve element 27 is formed as the enlarged inner end of the stem 14 and is slidable through the seat unit 13 from a seated position to a position for unseating the valve element 26, as shown in Figure 2, or may be moved so that, as shown in Figure 3, both valve elements are opened and a controlled flow through the valve structure may be effected by varying the extent of opening of the valve element 27. The spring 28 operating through the spherical valve 26 which abuts the lower end of the valve element 27, urges element 27 into seated position, this movement being limited by the enlargement 20 abutting the shoulder 29 at the outer end of the counterbore 15'.

As a means providing for a restricted flow of the fluid through the valve structure when the valve element 26 is unseated, the lower end of the element 27 is concaved in conformity with the curvature of the element 26 and is provided with a series of radial grooves or channels 30 opening at their inner ends into a restricted flow duct 31 extending diagonally through the valve 27. Duct 31 opens at its outer end on the outer surface of element 27 at a point above the seated portion of the latter and in the general direction of the outlet port 10. With this arrangement, when the valve elements 26 and 27 are seated, the channels 30 are disposed so as to open into the annular space 30' between the elements 26 and 27, and when the element 26 is unseated while the element 27 remains seated, these channels immediately afford communication through the restricted flow duct 31 between the inlet and outlet ports whereby a uniform restricted flow will take place. In this connection it should be noted that the diameter of the discharge orifice 31' of the duct 31 determines the volume of the restricted flow and may be varied to suit the particular conditions at hand, it being here shown of such small diameter as not to appreciably affect the line or storage pressure in the conduit or vessel from which the fluid is drawn.

It should be noted with reference to Fig. 3, that the main flow valve element 27 is cylindrical as at 27a from its lower end to a point where it is sealed in the seat unit 13. From this sealing point, the element 27 tapers toward the stem 14 with a large radius as at 27b, to the point 27c where it is joined to the cylindrical lower end of the valve stem 14. This formation provides for varying the size of the annular flow passage between the valve element 27 and the seat unit 13 with a nicety to control the volume of flow according to the extent of opening of said valve element.

Referring now to the combined valve seat and sealing unit 13, it is seen that it comprises an annulus 32 of metal or other suitable material having a cylindrical bore 33 slidably accommodating the main flow valve element 27 and providing at its inner end an annular valve seat 34 chamfered to provide a seat for the spherical valve element 26, and to permit the elements to extend into the bore 33 when seated. The outer end portion of the annulus 32 is externally reduced in diameter to form a recess 34a in which is seated the lower end of the plug 16 to hold the annulus in place between the plug and the shoulder 23 in the bore 6.

Mounted in an annular groove 35 formed in the annulus 32 so as to open into the bore 33 at a point intermediate the ends thereof, is a resilient pressure responsive seat 36 of rubber or similar material for effecting a sealing contacting with the cylindrical portion 27a of the valve element 27. A similar groove 37 formed in the inner end of the annulus 32 has a similar seal 38 therein, arranged to seal against the spherical surface of the valve element 26 at a point inwardly of the valve seat 34, and to also seal against the wall of the bore 6 opposite thereto.

In accordance with this invention, means are embodied in the seat unit 13 for transmitting forces applied by fluid pressure against the seal 38, to the seal 36, so that the latter will have an increased sealing action against the main flow valve element 27 when both valves are seated, and when the restricted flow valve element 26 is unseated and the main flow valve element 27 remains seated. As here shown, this means is operative in ducts or passages 39 extending diagonally in the annulus 32 between the grooves 35 and 37 in the general direction of flow of fluid, and comprises webs 40 or like members preferably of the same material as the seals, and in joined or abutting relation thereto. Thus, this arrangement makes it possible to vulcanize the seals and the web portions in integral relation and to the annulus, thereby forming a simple unit structure.

It should be noted that the seal 36 for the valve element 27 is substantially rectangular in cross section, whereas the seal 38 for the valve 26 is of special shape so that it not only seals against the valve element 26, but operates to transmit a force through the webs 40 to increase the sealing action of the seal 36, and seals against the wall of the bore 6 opposite thereto. Thus, the seal 38 is formed with an annular groove presenting oppositely inclined annular surfaces 38a to the pressure fluid.

Operation of the dual valve unit 12 to unseat valve element 26 for taking off fluid in a restricted flow while the valve element 27 remains seated, and for opening both elements to effect a volume controlled flow, in greater amount than when valve 26 only is unseated, is provided for by suitable means operable exteriorly of the valve structure for progressively depressing the valve stem 14 against the action of spring 28. As here shown, this operating means comprises a lever 41 pivoted at one end as at 42 to an upstanding lug 43 on a ring 44 clamped between the flange 45 on the plug 16 in the adjacent end of the body member 5, said lever bearing between its ends upon the outer rounded end 46 of the stem 14. Movement of the lever inwardly will depress the stem and operate the dual valve unit 12 according to the extent of movement of the stem as hereinbefore described. The ring and lever may as here shown be provided with openings 47 and 48 respectively, whereby a tie member or other suitable means, not shown, may be employed to hold the lever in position such that the desired operation of the valve unit 12 may be maintained for indefinite periods of time.

As shown in Figures 5, 6, 7 and 8, a modified form of this invention differs from the previously described form in that the dual valve elements of the valve unit 50 are joined one to the other as by integral formation instead of being separate as in the valve unit 12. This modification also requires the use of a somewhat modified form of valve seat and sealing unit 51. Otherwise, the parts of this modified form are identical with corresponding parts of the first described form and comprise a corresponding body member 52 having a bore 53 and inlet and outlet ports 54 and 55. A plug 56 holds the seat unit 51 in place, and a spring 57 urges the valve unit to seating position. The same operating means (not here shown) is employed for this modified form as in the first described form.

More specifically, the valve unit comprises a stem 58 having an enlarged portion forming a main flow valve element 59 corresponding to the valve element 27 but having a longer cylindrical portion 59a extending through the valve seat unit 51 and to which is joined the restricted flow valve element 60 in the form of an annular flange 60a. The element 60 is located intermediate the ends of the portion 59a and below the valve seat unit. The spring 57 fits over the lower end of the portion 59a and abuts the lower side of the flange 60a.

A restricted flow duct 61 extends diagonally through the valve element 59 to afford communication between the inlet and outlet ports 54 and 55 when the valve element 60 is unseated while valve element 59 remains seated. This duct has a small inlet orifice 61a opening at the top of valve element 60, that is, at the juncture of the top of flange 60a with the portion 59a and this orifice is closed when the valve element 60 is seated (see Fig. 5) but is opened when valve 60 is unseated, as shown in Fig. 6.

The valve seat and sealing unit 51 comprises an annular metal body 62 having a bore 63 coaxial with the bore 53 in the body member 52. An annular seat portion 64 depends from the body 62, and in having a greater internal diameter than said bore is disposed in laterally offset relation to the bore 63, with its lower end providing a seat for the valve element 60.

The cylindrical portion 59a of the valve element 59 has a working fit in the bore 63 of the seat body member 62 and is adapted to seat therein against an annular pressure responsive sealing member 65 formed of resilient rubber or similar material. This sealing member 65 is mounted in a recess 66 in the body 62 around the exterior of the seat portion 64 and extends somewhat below the latter so as to seal against the valve element 60 as well as against the valve element 59 as shown in Fig. 5. An annular groove or depression 67 is formed in the valve element 60 to accommodate the lower edge of the sealing member 65, said edge and groove being correspondingly rounded. The orifice 61a opens into the groove 67 and is positively closed by the sealing member 65, as will be apparent with reference to Figure 1.

Another annular fluid pressure responsive sealing member 68 is mounted to surround the depending seat portion 64 and seals against the wall of the bore 53, being formed of the same resilient rubber or similar material as sealing member 65. The lower side of the sealing member 68 is grooved to define oppositely inclined surfaces 68a which cause the sealing member to be expanded laterally against the wall of the bore 53 and against the outer side of the seat portion 64 to assure an effective seal.

The two sealing members are cooperatively arranged so that the force of fluid pressure against one member to increase the sealing action thereof is transmitted thereby to the other sealing member to increase the sealing action thereof. Thus, said members are operatively connected as here provided by means of integral web portions 70 extending through radial openings 71 formed in the depending seat portion 64. When the sealing member 68 responds to fluid pressure, the webs 70 transmit a force which also increases the sealing action of the member 65. This arrangement makes it possible to vulcanize the sealing means to the body 62.

In this modification, the operation is the same as in the form of the invention shown in Figures 1 to 4 inclusive. Figure 5 shows both valve elements 59 and 60 seated. Figure 6 shows how valve element 60 is unseated while valve element 59 remains seated to confine the fluid to the restricted passage 61. When both valve elements are open as shown in Figure 7, a controllable large volume flow is permitted for the purposes and in the manner hereinbefore described.

I claim:

1. A valve structure comprising: a body member having a fluid passage extending therethrough, valve means movable in said passage to control the flow therethrough; means fixed in said passage providing a pair of yieldable seals supported independently of said valve means for cooperation with said valve means; and means forming a resilient connection between said seals for transmitting forces applied by fluid pressure to one seal, to the other seal for increasing the sealing action of the other seal against said valve means when said valve means is disengaged from one of said seals.

2. A valve structure comprising: a body member having a fluid passage therethrough, valve means for controlling the flow of fluid through the passage, means forming stationary and resilient seals around the valve means at axially spaced points in said passage, and means independent of said valve means operable to urge the seals against the valve means in response to fluid pressure applied to but one of said seals, said last named means operating to urge one of said seals against said valve means when said valve means is disengaged from another of said seals.

3. In a valve structure, means providing two fluid passages, valve means movable between a seated position shutting off the flow through said passages and an unseated position for effecting flow through only one of said passages, into a position affording flow through the other passage; resilient pressure responsive seals fixed at spaced points in said passage and means independent of said valve means for urging one of the seals against the valve means incident to the application of fluid pressure to another of the seals while said valve means is disengaged from another of said seals as well as when said valve means is engaged with said seals.

4. In a valve structure, a body member having inlet and outlet ports and a fluid passage therebetween, a main flow valve element in said passage, a seat therefor, a second valve seat between said inlet port and the first named valve seat, there being a flow restricting duct extending through said main flow valve element and opening at one end into said passage above the first named valve seat, and having its other end opening into said passage between said seats, a second valve element for controlling flow through said duct, urged towards the second valve seat, a fluid pressure responsive seal associated with the second valve seat to form a seal with the second valve, a support on said body member stationarily mounting said seats and said seal, and means on said support movable relative thereto responsive to fluid pressure against said seal for increasing the sealing action of said first named seat against said main flow valve.

5. A valve seat and sealing unit comprising: a valve seat member having a bore therethrough providing an annular valve seat, means forming an annular resilient seal in said bore on one side of said seat for sealing contact with a valve means movable in the bore into and out of contact with said seat, means forming a second annular resilient seal on said seat member on the other side of said seat adapted for sealing contact with said valve means; said seat member providing a passage between said annular seals, and means in said passage connected with said seals and responding to pressure applied to one of said annular seals for applying a force to the other of said seals to urge the other seal into sealing contact with said valve means.

6. A valve seat and sealing unit comprising: an annular valve seat member having a bore therethrough providing an annular valve seat and having a recess in said bore adjacent one side of said annular seat, said seat member having a second recess adjacent the other side of said annular seat and passages extending between said recesses; and resilient means in said recesses and passages forming seals connected through said passages and adapted to have sealing contact with a valve means movable in said bore into and out of contact with said valve seat; the connection between said seals extending in the general direction of the axis of said bore and providing for increasing the sealing action of one of the seals responsive to fluid pressure applied to the other seal.

7. In a valve structure, a body member having inlet and outlet ports and a fluid passage between said ports, a main flow valve element in said passage, a valve seat member in said passage stationarily mounted on said body member, a valve seat on said seat member for said valve element, said valve seat member providing a second valve seat in said passage, a second valve element carried by and fixed against movement relative to the first valve element in a position to be seated and unseated relative to said second seat without unseating the first named valve element; said main flow valve element having a flow restricting duct for confining the flow therethrough between said ports when the main flow valve element remains seated while the second valve element is unseated; spring means urging said valve elements to seated position, and operating means movable to unseat said second valve element while the main flow valve element remains seated and further movable to unseat both valve elements, said main flow valve element having a portion extending beyond said valve seats in a direction toward said inlet port, said second named valve element being in the form of an annular flange on said extended portion of the main flow valve element.

8. In a valve structure, a body member having inlet and outlet ports and a fluid passage between said ports, a main flow valve element in said passage, a valve seat member in said passage stationarily mounted on said body member, a valve seat on said seat member for said valve element, said valve seat member providing a second valve seat in said passage, a second valve element carried by and fixed against movement relative to the main flow valve element in a position to be seated and unseated relative to said second seat without unseating the first named valve element; said main flow valve element having a flow restricting duct for confining the flow therethrough between said ports when the main flow valve element remains seated while the second valve element is unseated; spring means urging said valve elements to seated position, operating means movable to unseat said second valve element while the main flow valve element remains seated and further movable to unseat both valve elements, an annular resilient fluid pressure responsive sealing member on said valve seat member for forming a seal around said main flow valve element as a seat therefor and for sealing against the second named valve element and closing said duct when the second named valve element is seated, a second fluid pressure responsive sealing member on said valve seat member forming a seal between the wall of said passage and said second valve seat, and means carried by said valve seat member and movable relative thereto in response to fluid pressure against the second sealing member for increasing the sealing action of the first named sealing member.

9. A valve structure comprising: a body member having a bore and inlet and outlet ports opening into said bore, a valve seat member mounted in said bore between said ports having a passage therethrough coaxial with said bore, a second valve element movable axially in said passage having a recessed end, a spherical valve element engaged with said recessed end, an annular fluid pressure responsive sealing member mounted on said seat member in said passage for sealing against said valve member as a valve seat therefor, an annular valve seat for said spherical valve element, formed on said seat member, spring means in said bore engaging said second valve element for urging said valve elements to seated positions, said second valve element having a flow restricting duct extending therethrough so as to open at one end into said recess and at its other end into said bore at a point between the valve seat member and the outlet port; said valve elements providing therebetween while in contact one with the other, a space affording communication between said ports through said duct when the second valve element is seated and the sealing means maintains a seal between the seat member and the second valve element to confine the flow to said duct; and operating means connected with said second valve element movable to unseat the spherical valve element while the second element is seated against said sealing element, and further movable to unseat both valve elements.

10. A valve structure comprising: a body member having a bore and inlet and outlet ports opening into said bore, a valve seat member mounted in said bore between said ports having a passage therethrough coaxial with said bore, a cylindrical valve element movable axially in said passage having a recessed end, a spherical valve element engaged with said recessed end, an annular fluid pressure responsive sealing member mounted on said seat member in said passage for sealing against said valve member as a valve seat therefor, an annular valve seat for said spherical valve element, on said seat member and surrounding said sealing member, spring means in said bore engaging said spherical element for urging said valve elements to seated positions, said cylindrical valve element having a flow restricting duct extending therethrough so as to open at one end into said recess and at its other end into said bore at a point between the valve seat member and the outlet port, said valve elements providing therebetween while in contact one with the other, a space affording communication between said ports through said duct when the spherical element is seated and the sealing means maintains a seal between the seal member and the cylindrical valve element to confine the flow to said duct; operating means connected with said cylindrical valve element, movable to unseat the spherical valve element while the cylindrical element is seated against said sealing element, and further movable to unseat both valve elements, a second fluid pressure responsive sealing member on said seat member forming a seal between said seat member and the wall of said bore, and portions joining said sealing members for transmitting to the one of said members a force derived from the fluid pressure response of the other sealing member.

11. In a valve structure, comprising: a body member having a bore and inlet and outlet ports opening into said bore, a valve seat member mounted in said bore between said ports, having a passage therethrough coaxial with said bore, an annular fluid pressure responsive sealing member mounted on said seat member in said passage to serve as a valve seat, a first valve element movable in said passage between seated and unseated positions relative to said sealing member, an extension on said valve element disposed to one side of said sealing member when said valve element is in sealing contact with the sealing member, an annular flange on said extension forming a second valve element, an annular valve seat on said seat member depending therefrom for contact with said second valve element, said first valve element having a flow restricting duct extending therethrough with one end opening adjacent the side of the second valve element opposed to said annular seat and which is opened to said bore and said inlet port when the second valve element is unseated, the other end of said duct opening into said bore between the seat member and the outlet port, said sealing member operating when said second valve element is unseated to seal against the first-valve element and confine the flow through said duct, means urging said valve elements to seated position, and operating means movable to unseat the second valve element and further movable to unseat both valve elements.

12. In a valve structure, comprising a body member having a bore and inlet and outlet ports opening into said bore, a valve seat member mounted in said bore between said ports, having a passage therethrough coaxial with said bore, an annular fluid pressure responsive sealing member mounted on said seat member in said passage to serve as a valve seat, a cylindrical valve element movable in said passage between seated and unseated positions relative to said sealing member, an extension on said valve element disposed to one side of said sealing member when the valve element is in seated contact with the sealing member, an annular flange on said extension forming a second valve element, an annular valve seat on said seat member depending therefrom for contact with said second valve element, said cylindrical valve element having a flow restricting duct extending therethrough with one end opening adjacent the side of the second valve opposed to said annular seat and which is opened to the bore and inlet port when the second valve member is unseated, the other end of said duct opening into said bore between the seat member and the outlet port, said sealing member operating when said second valve element is unseated, to seal against the cylindrical element and confine the flow through said duct, means urging said valve elements to seated position, operating means movable to unseat the second valve element and further movable to unseat both valve elements; a second fluid pressure responsive sealing member mounted between said annular valve seat and the wall of said bore, said annular valve seat having openings extending therethrough, and webs of the same material as said sealing members joined thereto and extending through said openings for transmitting the fluid pressure reactive forces of the second sealing member to the first named sealing member to increase the sealing action of the latter.

13. In a valve structure, comprising a body member having a bore and inlet and outlet ports opening into said bore, a valve seat member mounted in said bore between said ports, having a passage therethrough coaxial with said bore, an annular fluid pressure responsive sealing member mounted on said seat member in said passage to serve as a valve seat, a main valve element movable in said passage between seated and unseated positions relative to said sealing member, an extension on said valve element disposed to one side of said sealing member when the valve element is in sealing contact with the sealing member, a flange on said extension forming a second valve element, an annular valve seat on said seat member for contact with said second valve element, said main valve element having a flow restricting duct extending therethrough with one end opening adjacent the side of the second valve opposed to said annular valve seat and which is opened to the bore and inlet port when the second valve element is unseated, the other end of said duct opening into the bore above the seat member, said sealing member operating when said second valve element is in said one unseated position to seal against the main element and confine the flow through said duct, means urging said valve elements to seated position, operating means movable to unseat the second valve element and further movable to unseat both valve elements, a second fluid pressure responsive sealing member mounted between said annular valve seat and the wall of said bore, said annular valve seat having openings extending therethrough, and webs of the same material as said sealing members joined thereto and extending through said openings for transmitting the fluid pressure reactive forces of the second sealing member to the first named sealing member, said first named sealing member sealing against said second valve element when the latter is seated.

14. A valve seat and sealing unit, comprising: a valve seat member having a bore therethrough, an annular valve seat on said member, annular fluid pressure responsive sealing members between which said valve seat is disposed, said seat member having openings therein adjacent said valve seat, and webs joining said sealing members through said openings.

15. A valve seat and sealing unit comprising: a valve seat member having a bore therethrough, an annular valve seat on said member, annular fluid pressure responsive sealing members on said seat member, one of said annular sealing members having its inner surface substantially flush with the wall of said bore, and means connected with said seat member and joining said sealing members.

16. A valve seat and sealing unit, comprising: a valve seat member having a bore therethrough, an annular valve seat extending from one side of said member having a diameter greater than that of said bore, annular fluid pressure responsive sealing members lining the inner and outer surfaces of said annular valve seat and contacting the adjacent surfaces of said seat member, said annular valve seat having openings thereon; and webs joining said sealing members through said openings.

17. A valve structure comprising: a body member having a fluid passage therethrough, valve means for controlling the flow of fluid through the passage, means fixed in said passage independent of said valve means providing yieldable seats for said valve means, and means operatively connecting said seats and which in response of one of the seats to fluid pressure, increases the sealing action of another of the seats against the valve means when said valve means is disengaged from one of said seats.

18. In a valve structure; a body member having a fluid passage therethrough; a valve means having a flow restricting duct and being movable in said passage between a seated position shutting off the flow through said passage and an unseated position for effecting flow through the passage, into a position restricting flow through said duct; resilient pressure responsive seals fixed in said passage; a member on which said seals are supported stationarily mounted on said body member; and means on said seal supporting member movable relative thereto for urging one of the seals against the valve means incident to the application of fluid pressure to another of the seals while said valve means is in said position shutting off flow through said passage, as well as when said valve means is in said position to confine the flow through said duct.

19. In a valve structure; a body member having inlet and outlet ports and a fluid passage therebetween; a valve seat support stationarily mounted in the passage; a dual valve means having a flow restricting duct and being movable in said passage between a seated position shutting off the flow through said passage and different unseated positions for effecting a volume control of flow through the passage, into a position confining the flow through said duct; a pair of resilient fluid pressure responsive seals mounted on said support; and means movable relative to said support disposed between and joining said seals, operable for urging one of the seals against the valve means incident to fluid pressure response of the other seal when the valve means is in position to confine flow through said duct.

20. A valve seat and sealing unit comprising, a valve seat member providing an annular valve seat, means forming a resilient seal fixed on said seat member to one side of said annular seat for sealing contact with a valve means movable toward and away from said seat, and resilient fluid pressure responsive means carried by said seat member and movable under fluid pressure relative thereto, said last named means being in contact with said seal and exposed on the other side of said seat for applying a force to said seal to increase the sealing action thereof.

21. A valve seat and sealing unit comprising, a valve seat member providing an annular valve seat, resilient means forming a seal on said seat member fixed to said seat member adjacent one side of said annular seat for sealing contact with a valve means movable toward and away from said seat, and resilient fluid pressure responsive means carried by said seat member and movable under fluid pressure relative thereto, said last named means being in contact with said seal and exposed on the other side of said seat for applying a force to said seal to increase the sealing action thereof when said valve means is unseated.

22. A valve seat and sealing unit comprising: a member providing a valve seat, means providing on said member a stationary and resilient seal on each side of said valve seat adapted for sealing contact with a valve means when the latter is mounted to be moved toward and away from said seat, and means including a resilient medium on said member movable relative thereto in contact with said seals whereby a force derived from fluid pressure applied to one seal will be applied to the other seal.

References Cited in the file of this patent

UNITED STATES PATENTS

| Number | Name | Date |
|---|---|---|
| 1,650,077 | Lamb | Nov. 22, 1927 |
| 1,755,993 | Kelly | Apr. 22, 1930 |
| 1,991,214 | Hoff | Feb. 12, 1935 |
| 1,998,913 | Wheaton | Apr. 23, 1935 |
| 2,182,278 | Brauer | Dec. 5, 1939 |
| 2,265,496 | Shaw | Dec. 9, 1941 |
| 2,369,025 | Cummings | Feb. 6, 1945 |